C. J. SANDRIK.
VEHICLE WHEEL.
APPLICATION FILED SEPT. 7, 1910.
1,020,450.
Patented Mar. 19, 1912.
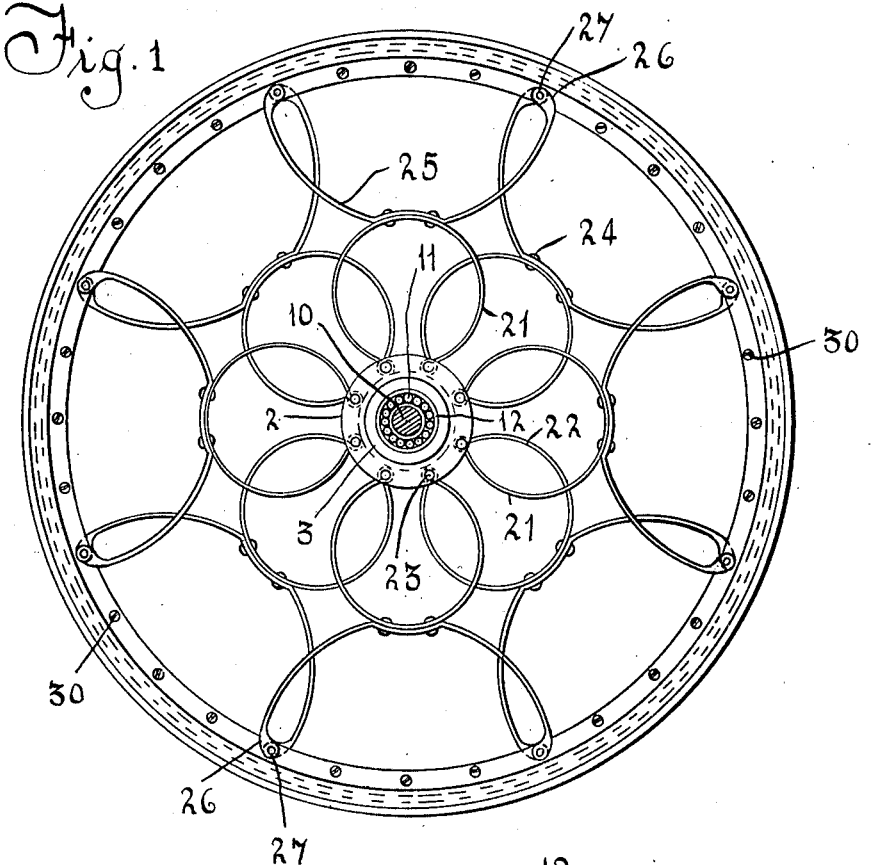
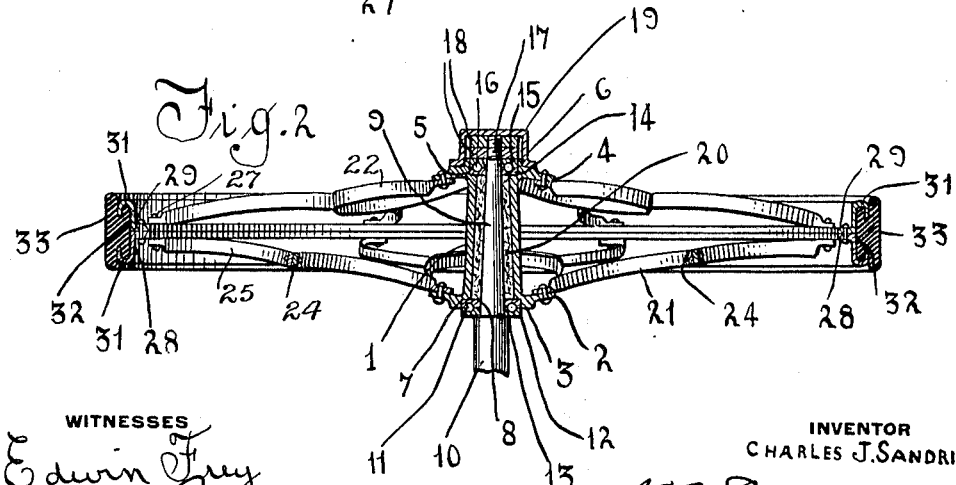
WITNESSES
Edwin Frey
INVENTOR
CHARLES J. SANDRIK
By
Attorneys

UNITED STATES PATENT OFFICE.

CHARLES J. SANDRIK, OF EAST PITTSBURGH, PENNSYLVANIA.

VEHICLE-WHEEL.

1,020,450.  Specification of Letters Patent.  Patented Mar. 19, 1912.

Application filed September 7, 1910. Serial No. 580,825.

*To all whom it may concern:*

Be it known that I, CHARLES J. SANDRIK, a citizen of the United States of America, residing at East Pittsburgh, in the county of Allegheny and State of Pennsylvania, have invented certain new and useful Improvements in Vehicle-Wheels, of which the following is a specification, reference being had therein to the accompanying drawing.

This invention relates to vehicle wheels especially designed for automobiles, the invention having for its object the provision of positive and reliable means for cushioning a hub within the felly of a wheel.

Another object of the invention is to obviate the necessity of using springs beneath the body of a vehicle and to incorporate the springs within the wheel in such a manner that the body of the vehicle will be thoroughly cushioned and normally maintained in a horizontal position.

A further object of the invention is to obviate the necessity of using pneumatic tires and rigid spokes in connection with a wheel, and to provide resilient spokes or supporting elements that will coöperate in supporting a hub concentrically of the felly of a wheel.

The above objects are attained by a mechanical construction that will be hereinafter specifically described and then claimed.

Reference will now be had to the drawing, wherein:—

Figure 1 is a side elevation of a wheel in accordance with this invention, and Fig. 2 is a horizontal sectional view of the same.

A wheel in accordance with this invention comprises a hub constituting a lubricant reservoir, inner circumferentially arranged springs connected to said hub, a sectional felly, circumferentially arranged outer springs connecting said felly to said inner springs, and a resilient tire carried by said felly.

The hub comprises a tapering sleeve 1 having the inner end thereof provided with a peripheral flange 2 and with an annular seat 3. The outer end of the hub 1 is provided with a peripheral flange 4, an annular seat 5 and an exteriorly threaded nipple 6. Mounted in the seat 3 of the sleeve 1 is a circular bearing plate 7 having a central opening 8 through which extends the spindle 9 of an axle 10. The bearing plate has the outer side thereof provided with a ball race for anti-friction balls 11, these balls extending into another race provided therefor in the inner face of a bearing plate 12 mounted upon the spindle 9 against the annular shoulder 13 of the axle 10. Mounted upon the seat 5 at the outer end of the sleeve 1 are bearing plates 14 and 15 having interposed anti-friction balls 16, said balls and bearing plates being similar in all respects to the balls and bearing plates at the inner end of the sleeve 1.

The outer end of the spindle 9 is threaded, as at 17 to receive nuts 18 and these nuts are inclosed by a cap 19 screwed upon the nipple 6. The spindle 9 is of a less diameter than the interior diameter of the sleeve 1 and thereby provides an annular space constituting a lubricant reservoir 20 in which can be placed waste or other matter for holding a lubricant in suspension upon the spindle 9.

The peripheral flanges 2 and 4 of the sleeve 1 are apertured and connected to said flanges are two sets of circumferentially arranged and equally spaced band springs 21 and 22, the set of springs 21 being arranged upon the inner side of the wheel and the set of springs 22 upon the outer side and staggered with relation to the springs 21, all of said springs being circumferentially arranged relatively to the hub and having the ends thereof connected to the peripheral flanges 2 and 4 by rivets or other fastening means 23.

Riveted or otherwise connected, as at 24 to the springs 21 and 22 intermediate the ends thereof are the outer springs, these springs comprising a plurality of circumferentially arranged band springs 25, said springs intermediate the ends thereof being shaped to conform to the curvature of the springs 21 and 22, whereby the springs 25 can be easily connected to the springs 21 and 22 and have a substantial bearing upon said springs. The outer ends of the springs 25 are flattened, as at 26 and riveted or otherwise connected, as at 27 to the inner and outer sides of the felly of the wheel. The felly of the wheel comprises two circular sections 28 and 29 to which the springs 25 are connected, and said sections are connected together by a plurality of circumferentially arranged and equally spaced rivets or screws 30. The sections 28 and 29 of the felly are provided with the clencher type of tire holder, constituting two circumferentially arranged gripping members 31 adapted to embrace the web 32 of a resilient tire 33, preferably made of vulcanized rubber.

From the foregoing it is apparent that the hub is cushioned irrespective of the direction the same moves, and the arrangement of the springs 21, 22 and 25 is such that the hub is normally maintained centrally of the wheel and cannot be easily sprung from either the outer or inner side of the wheel. It is through the medium of the lubricant reservoir 20 and the antifriction bearings that an easy operation of the spindle 9 within the hub is accomplished without any undue wear or tear upon the same.

The wheel, with the exception of the tire 33, is made entirely of light and durable metal, and by increasing the dimensions of the material entering into the construction, the wheel can be used for large motor driven trucks and heavy vehicles.

What I claim is:—

A spring wheel comprising a hub having an annular flange at each end, a rim having a centrally disposed inwardly extending annular flange, a circumferentially extending series of split annular inwardly inclined resilient members having their ends secured to the inner face of one of the flanges of the hub, a circumferentially extending series of split resilient inwardly inclined annular members having their ends secured to the inner face of the other of the flanges of the hub, the members of one series inclining toward the members of the other series, each of the members of one series opposing the portions of a pair of the members of the other series, band springs having the intermediate portion thereof secured to the outer portion of the periphery of the members of one series and having their ends secured to one side of the flange of the rim, said band springs extending inwardly at an inclination, and band springs having the intermediate portion thereof secured to the outer portion of the periphery of the members of the other series and secured to the other face of the flange of the rim, said last mentioned band springs extending inwardly at an inclination.

In testimony whereof I affix my signature in the presence of two witnesses.

CHARLES J. SANDRIK.

Witnesses:
EVA A. MILNE,
KARL H. BUTLER.